United States Patent [19]
Zou et al.

[11] Patent Number: 5,691,896
[45] Date of Patent: Nov. 25, 1997

[54] FIELD BASED PROCESS CONTROL SYSTEM WITH AUTO-TUNING

[75] Inventors: Hehong Zou, Plymouth; Kale P. Hedstrom, St. Paul; Jogesh Warrior; Coy L. Hays, both of Chanhassen, all of Minn.

[73] Assignee: Rosemount, Inc., Eden Prairie, Minn.

[21] Appl. No.: 515,410

[22] Filed: Aug. 15, 1995

[51] Int. Cl.$^6$ .......................... G05B 13/02; G05B 11/42
[52] U.S. Cl. .................. 364/157; 364/162; 364/177; 364/138
[58] Field of Search ............................ 364/157, 148, 364/149–151, 152, 153, 158, 159, 160–162, 176, 177, 138, 139, 550; 318/561

[56] References Cited

U.S. PATENT DOCUMENTS

| | | | |
|---|---|---|---|
| 3,727,035 | 4/1973 | Pemberton | 235/150.1 |
| 4,006,346 | 2/1977 | Pemberton | 235/150.1 |
| 4,232,364 | 11/1980 | Bibbero | 364/105 |

(List continued on next page.)

FOREIGN PATENT DOCUMENTS

| | | |
|---|---|---|
| 0 037 565 | 5/1980 | European Pat. Off. . |
| 0 097 053 | 12/1983 | European Pat. Off. . |
| 0 379 215 A | 7/1990 | European Pat. Off. . |
| 0 533 498 A1 | 3/1993 | European Pat. Off. . |
| 0 571 080 A1 | 11/1993 | European Pat. Off. . |
| 0 572 245 A2 | 12/1993 | European Pat. Off. . |
| 0 626 627 A1 | 11/1994 | European Pat. Off. . |
| 2 600 789 | 12/1987 | France . |
| 56-57106 | 5/1981 | Japan . |
| 59-69807 | 4/1984 | Japan . |
| 62-280903 | 12/1987 | Japan . |
| 1-95301 | 4/1989 | Japan . |
| 01-304174 | 11/1989 | Japan . |
| 2-50701 | 2/1990 | Japan . |
| 2-297604 | 12/1990 | Japan . |
| 3-152601 | 6/1991 | Japan . |
| 3-235101 | 10/1991 | Japan . |
| 3-268102 | 11/1991 | Japan . |
| 4-34602 | 2/1992 | Japan . |
| 4-84201 | 3/1992 | Japan . |
| 4-102102 | 4/1992 | Japan . |
| 5-27804 | 2/1993 | Japan . |
| 6-35510 | 2/1994 | Japan . |
| 6-266408 | 9/1994 | Japan . |
| 7-31522 | 4/1995 | Japan . |
| WO/93/09481 | 5/1993 | WIPO . |

OTHER PUBLICATIONS

"PID Tuning: It's The Method, Not the Rules," D.W. St. Clair and P.S. Fruehauf, *INTECH Engineer's Notebook*, Dec. 1994, pp. 27–30.

"Tuning Process Controllers," T.B. Kinney, *Chemical Engineering*, Sep. 19, 1983, pp. 67–72.

"Internal Model Control. 4. PID Controller Design," D.E. Rivera, M. Morari, S. Skogestad, *Industrial & Engineering Chemistry Process Design and Development*, vol. 25, No. 1, Jan. 1986, pp. 252–265.

(List continued on next page.)

*Primary Examiner*—Joseph Ruggiero
*Attorney, Agent, or Firm*—Westman, Champlin & Kelly, P.A.

[57] ABSTRACT

A process control system controls a process through a control output signal based on a set point and a measured process variable. The process control system includes a control circuit having a set point input, a process variable input and a control output. The control circuit generates the control output signal on the control output as a function of the set point received on the set point input and the measured process variable received on the process variable input. An auto-tuning circuit excites the process, estimates a process model based on a rising dead time, a rising rate-of-change, a falling dead time and a falling rate-of-change in the measured process variable and then tunes the control function to the process based on the process model. The auto-tuning circuit obtains robust results, but is computationally simple such that the circuit can be implemented with hardware or software in low-power and low-memory applications, such as in such in field-mounted control units.

29 Claims, 5 Drawing Sheets

U.S. PATENT DOCUMENTS

| | | | |
|---|---|---|---|
| 4,441,151 | 4/1984 | Hayashibe | 364/157 |
| 4,563,734 | 1/1986 | Mori et al. | 364/157 |
| 4,602,326 | 7/1986 | Kraus | 364/158 |
| 4,646,226 | 2/1987 | Moon | 364/176 |
| 4,669,040 | 5/1987 | Pettit et al. | 364/162 |
| 4,679,136 | 7/1987 | Shigemasa | 364/150 |
| 4,814,968 | 3/1989 | Fukumoto | 364/150 |
| 4,852,053 | 7/1989 | Turrie | 364/151 |
| 4,855,674 | 8/1989 | Murate et al. | 324/158 R |
| 4,855,897 | 8/1989 | Shinskey | 324/148 |
| 4,882,526 | 11/1989 | Iino et al. | 318/561 |
| 5,043,862 | 8/1991 | Takahashi et al. | 364/162 |
| 5,126,933 | 6/1992 | White, III | 364/148 |
| 5,153,807 | 10/1992 | Saito et al. | 364/165 |
| 5,159,547 | 10/1992 | Chand | 364/157 |
| 5,170,341 | 12/1992 | Sklaroff | 364/162 |
| 5,184,122 | 2/1993 | Decious et al. | 340/870.16 |
| 5,331,541 | 7/1994 | Ueda et al. | 364/162 |
| 5,333,114 | 7/1994 | Warrior et al. | 364/550 |
| 5,341,288 | 8/1994 | Shinskey et al. | 364/159 |
| 5,371,670 | 12/1994 | Lurie | 364/160 |
| 5,406,474 | 4/1995 | Hansen | 364/148 |

OTHER PUBLICATIONS

"Auto–Tuning," *Adaptive Control*, K.J. Astrom and B. Wittenmark, Published by Addiston–Wesley Publishing Company, copyright 1989, pp. 328–342.

Advertising Brochure: "Excalibur 7000. The Cutting Edge of Technology." Robertshaw Tennessee, undated.

Advertisement: "Excalibur 7000. The Cutting Edge of Technology." published in *Instrumentation & Control Systems*, Sep. 1995, vol. 68, No. 9.

"Autotuning," *Automatic Tuning of PID Controllers*, K.J. Astrom, and T. Hagglund, published by Instrument Society of America, Copyright 1988, pp. 105–110.

"Design of PID Controllers," *Automatic Tuning of PID Controllers*, K.J. Astrom and T. Hagglund, published by Instrument Society of America, Copyright 1988, pp. 51–61.

Industrial Instrumentation Condensed Catalog, Robertshaw Tennessee, Apr. 1992.

FIELD BASED PROCESS CONTROL SYSTEM WITH AUTO-TUNING

BACKGROUND OF THE INVENTION

The present invention relates to an industrial process controller with low-complexity and robust auto-tuning which can be implemented in low power and memory applications, such as a field mounted control unit.

Field mounted control units include various devices, such as transmitters, actuators, transducers, switches and stand-alone controllers. Field mounted control units are used in process control systems to control the process, measure process variables and to generate outputs representative of the process variables for communication to central controllers or field control elements (e.g. values) over process control loops. The loops have included two-wire, three-wire and four-wire process control loops. Other loops have also been used, such as optical and radio frequency control loops.

Field mounted control units are mounted in a field area where current and voltage levels are typically limited to provide intrinsic safety. The units are often powered over the control loop. A separate transducer senses each process variable and provides the sensed variable to a transmitter for transmission to the central controller. Controllers can be located in a central control room or in the field and combine the transducer outputs to generate appropriate control output signals. Control output signals are typically sent over a separate control loop to remote actuators, such as valves, which control the process according to the control output signals. In certain applications, controllers select the most appropriate set of instructions for process control equipment.

In one application, the transmitter itself includes a control function which provides the control output signals to the remote devices directly, thereby bypassing the central controller. A control function can also be located in the other field control elements, such as valves. This type of control unit is referred to as a "smart" field mounted control unit and is disclosed in more detail in Warrior et al., U.S. Pat. No. 5,333,114, which is hereby incorporated by reference.

The control algorithm or equation performed by the controller in the transmitter or in the central control room is specially tailored to the process in which the controller is used. Several basic control algorithms exist, including Proportional (P), Proportional-Integral (PI) Proportional-Derivative (PD) and proportional-Integral-Derivative (PID) control algorithms. The performance of the control algorithm is determined by control parameters, such as $K_p$, $T_I$ and $T_D$ which correspond to the proportional gain, integral time and derivative time, respectively, for an ideal-type of PID control algorithm. In some applications, $K_P$ is replaced with a proportional band parameter PB, which is a function of $K_P$. Other types of PID control algorithms exist, such as parallel and serial equations. These algorithms have corresponding parameters which are similar to the ideal-type parameters. The control parameters are tuned based on a model of the underlying process to operate the optimally.

One of the most important tasks in tuning the control parameters is defining the initial process model and estimating the corresponding model parameters.

A model for a self-regulating process, such as a temperature, flow or pressure control process, can often be defined by a first order plus dead time equation. A model for a non-self-regulating process, such as a level control process, can be defined by an integrating equation. The corresponding model parameters are estimated by disturbing the process and observing a response in the process variable.

Several tuning methods are available to tune the control parameters once the process model parameters have been determined. In the Ziegler-Nichols' open-loop tuning method, the process variable y(t) is manually or automatically controlled to a stable state $Y_{SS}$ and a step function is applied to a control signal u(t). The process model parameters are then estimated by observing the response in the process variable. The process model parameter estimation is normally sensitive to the steady state value $Y_{SS}$. It is difficult to obtain desired closed loop responses if the steady state $Y_{SS}$ is not ideally established before starting the step function.

In the modified Ziegler-Nichols' frequency domain (closed loop) method, a relay feedback signal is added to a stable state control signal $u(t)=U_{SS}$ and toggled between two values to cause limit cycle oscillations in the process variable from which frequency domain parameters (ultimate period $T_U$ and gain $K_U$) can be estimated. The control parameters are then generated according to an experimentally based formula. The estimation of frequency parameters $T_U$ and $K_U$ is also sensitive to $Y_{SS}$. In addition, load and valve friction make tuning difficult and may lead to less than optimized tuned loops. For the purpose of robust and repeatable tuning, a pretuning stage is often needed to have a stable state $Y_{SS}$ before applying the disturbance to the process. The need for pretuning increases the algorithm complexity and the tuning time. The added complexity makes it difficult, if not impossible, to implement such a tuning algorithm in applications having limited power, memory and computational capability, such as in field-mounted control transmitters. These methods and other tuning methods are described in K. Astrom and B. Wittenmark, *Adaptive Control*, Addison-Wesley Publishing, Chapter 8 (1989).

SUMMARY OF THE INVENTION

The process control system of present invention includes a controller having a process variable input and a control output. The controller generates a control output signal on the control output as a function of a measured process variable received on the process variable input. An auto-tuner is coupled to the controller. The auto-tuner excites the process, estimates a process model based on a rising dead time, a rising rate-of-change, a falling dead time and a falling rate-of-change in the measured process variable and then tunes the function of the controller to the process based on the process model. The auto-tuner obtains robust results, but is computationally simple such that the circuit can be implemented with hardware or software in low-power and low-memory applications, such as in transmitter or valve based field-mounted control units.

The auto-tuner circuit can be configured to tune the control function for self-regulating processes and for non-self-regulating processes. In one embodiment, the auto-tuner comprises a performance input for receiving a user-defined performance factor. The auto-tuner tunes the control function based on the process model and the performance factor. The performance factor can be selected to provide aggressive, conservative and critically damped performance. The auto-tuner can be used to tune parameters for control functions such as P, PI, PD, PID and various other types of control functions.

The process control system can also include a trigger circuit which triggers the auto-tuner as a function of a received trigger command, a real time clock output, or an observation of the process.

3

Figure 1:
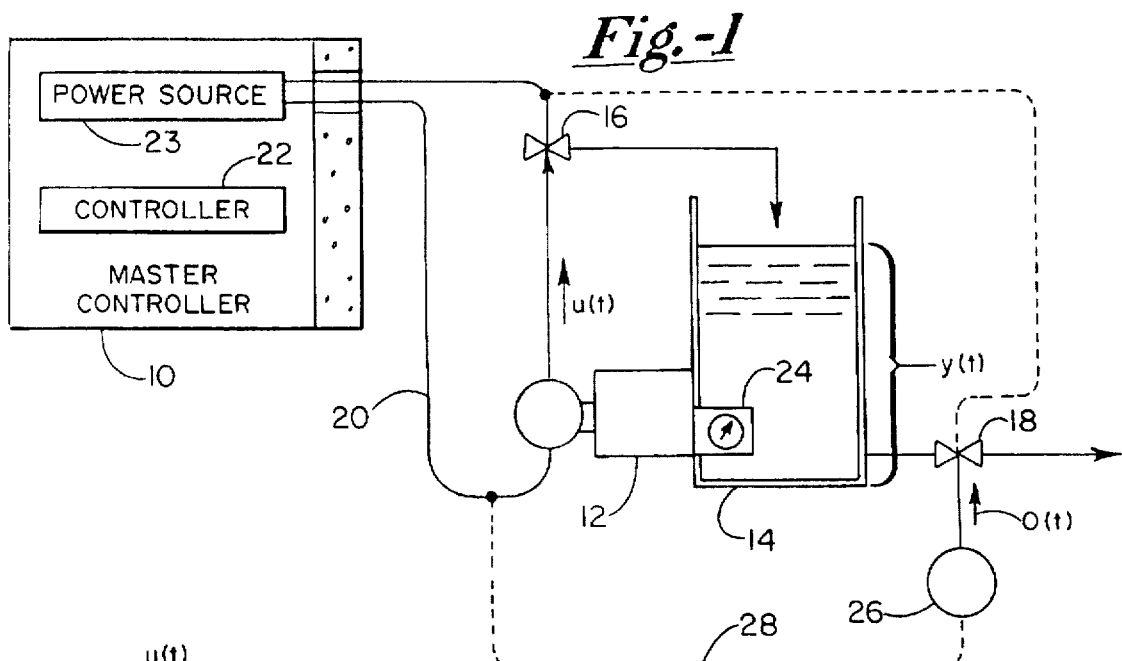
FIG. 1 is a diagram of a level control system according to one embodiment of the present invention.
Figure 2:
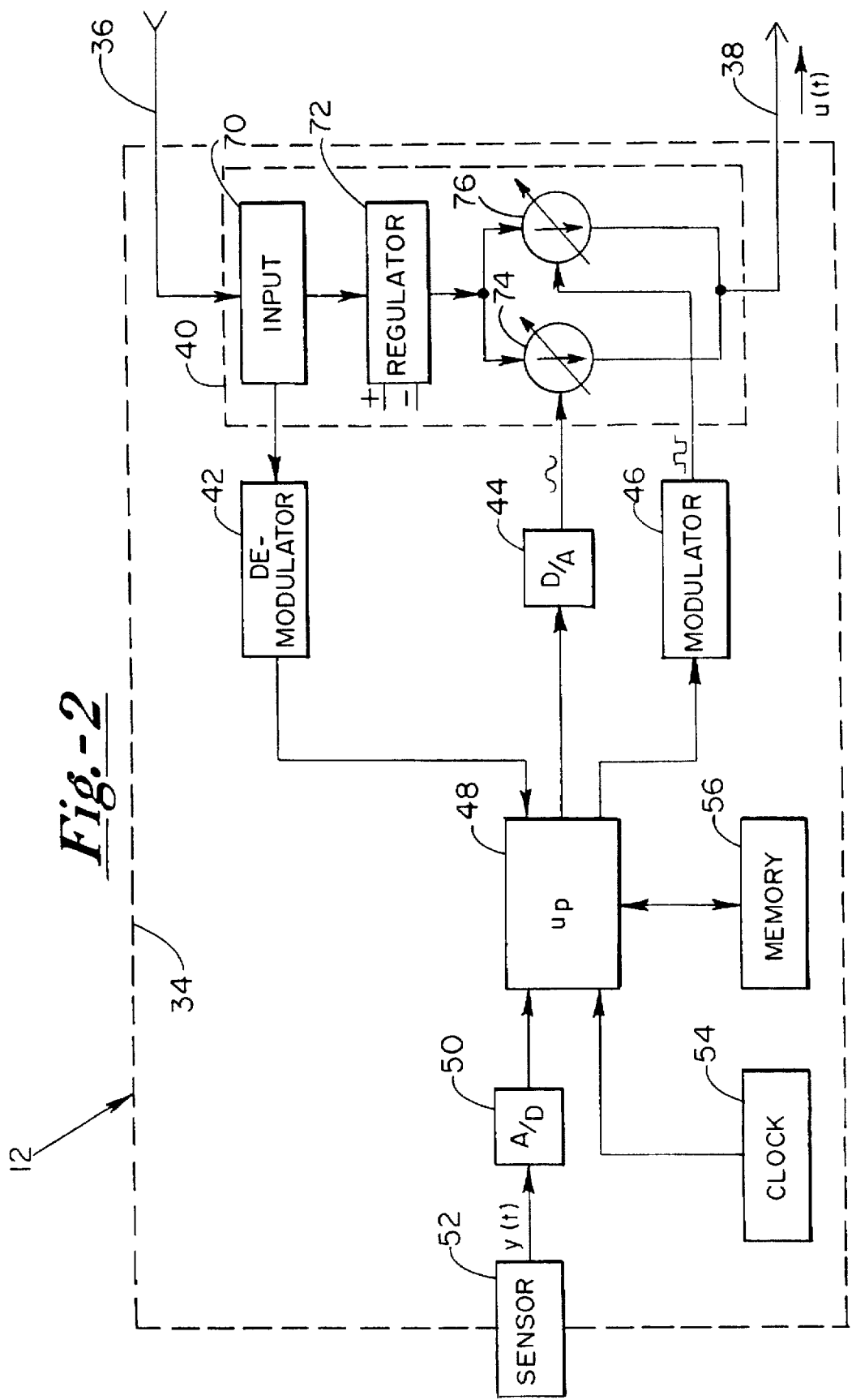

FIG. 2 is a block diagram of a transmitter shown in FIG. 1, which includes a control unit.

Figure 3:
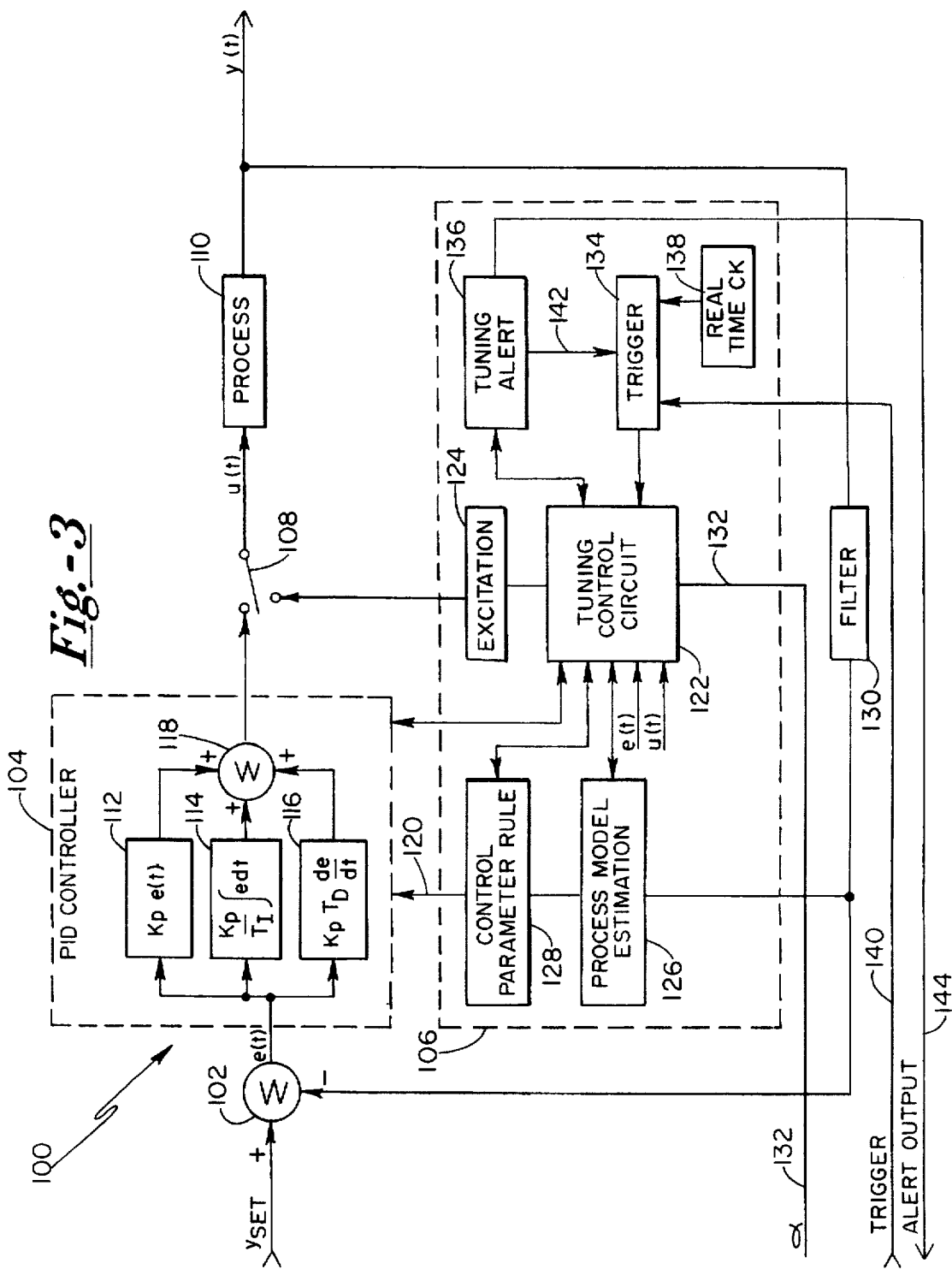

FIG. 3 is a diagram of a process control system of the present invention.

Figure 4:
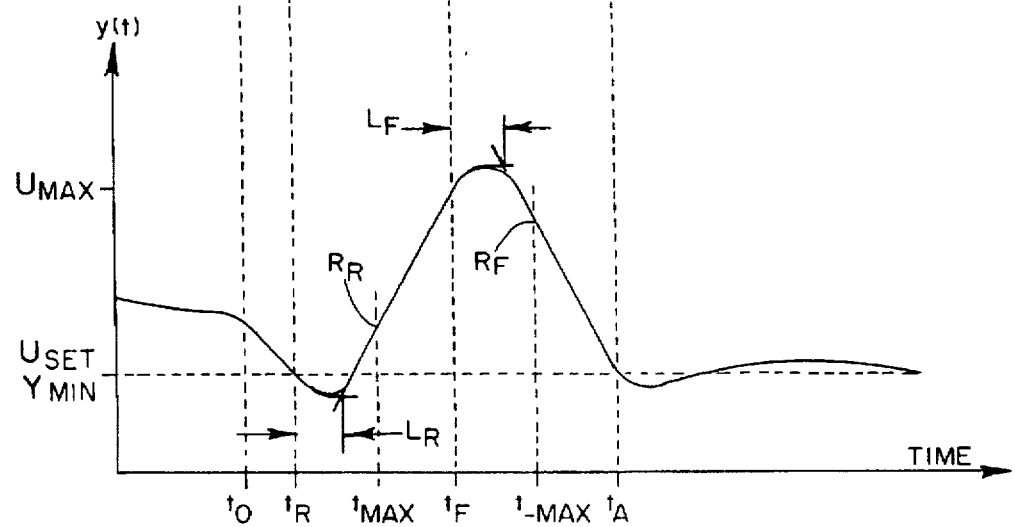

FIG. 4 is a waveform diagram illustrating an auto-tuning stage and a closed loop control stage for a non-self-regulating process, according to the present invention.

Figure 5:
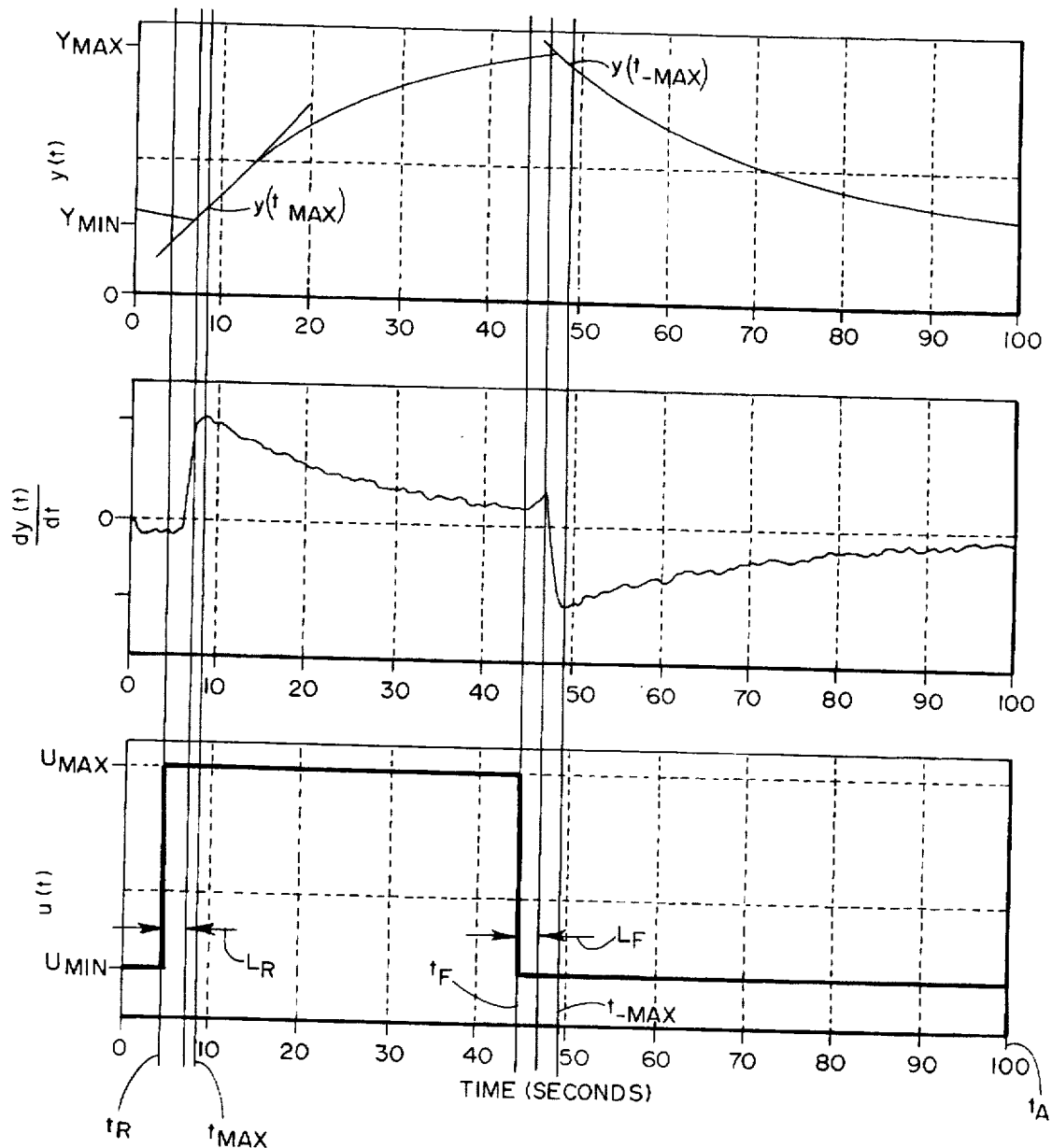

FIG. 5 is a waveform diagram illustrating an auto-tuning stage for a self-regulating process.

Figure 6:
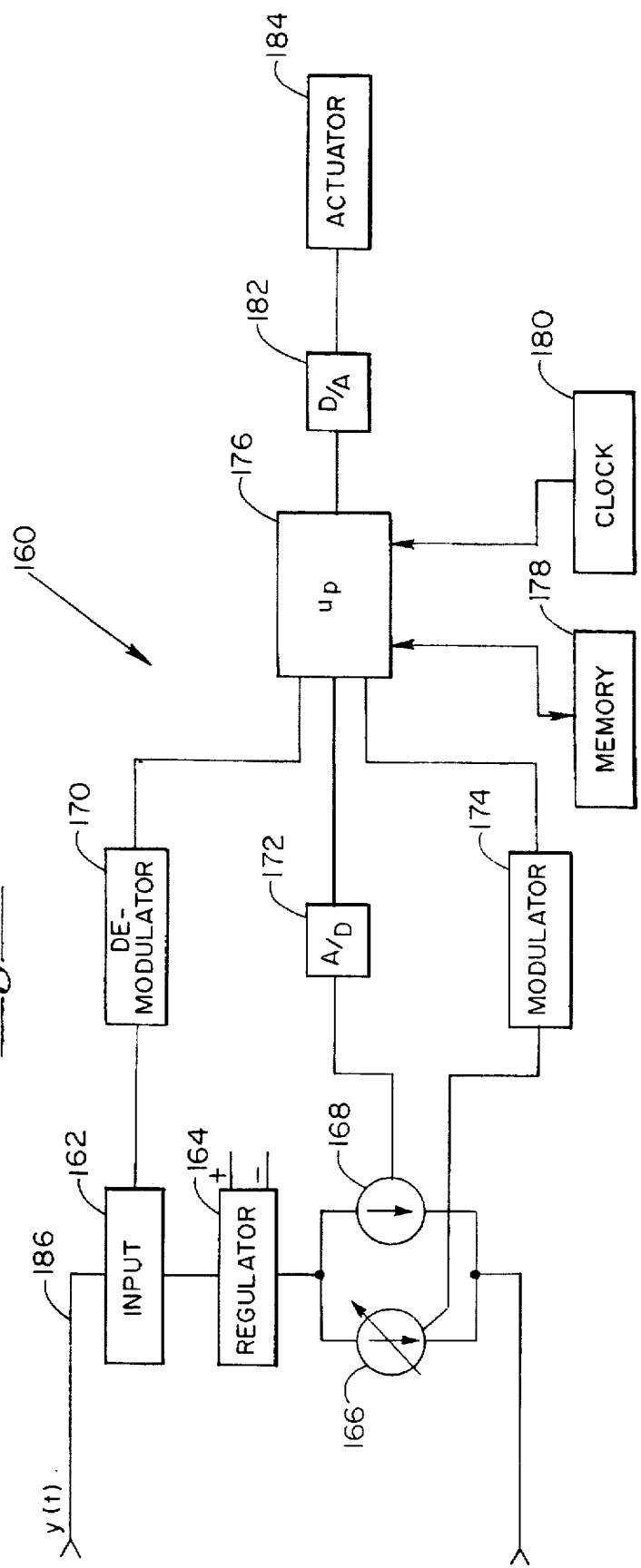

FIG. 6 is a block diagram of a valve having a control unit according to the present invention.

DETAILED DESCRIPTION OF THE PREFERRED EMBODIMENTS

The present invention is a process control system having a robust auto-tuning feature which is computationally simple such that the system can be implemented in a low-power field-mounted control unit in a process control system.

FIG. 1 is a diagram of one embodiment in which the process control system of the present invention is useful. The process control system includes master controller 10, transmitter 12, tank 14, input valve 16 and output valve 18. Master controller 10 is coupled to transmitter 12 ,and input valve 16 through two-wire process control loop 20. Loop 20 can include a 4–20 mA or a 10–50 mA current loop, for example, which allows master controller 10, transmitter 12 and valve 16 to communicate with one another by varying the current level through the loop. In an alternative embodiment, master controller 10, transmitter 12 and valve 16 communicate by varying the voltage level on loop 20. Concurrently, master controller 10 and transmitter 12 communicate digitally over loop 20 in a carrier modulated fashion, such as in the HART® protocol.

Other digital communication systems can be used, including a Fieldbus Standard which is presently being adopted by the Fieldbus Foundation. Alternatively, loop 20 carries baseband modulated digital signals such as DE protocol. In addition, master controller 10 and transmitter 12 can communicate with one another optically over single or dual optical fibers or by radio frequency. An example of an optical control circuit is disclosed in U.S. Pat. No. 5,258,868, which is hereby incorporated by reference.

Master controller 10 includes a controller 22 and a power source 23 which provide power and control to loop 20. Master controller 10 can be positioned in a central control room or in a remote, field location with transmitter 12. Master controller 10, transmitter 12 and valve 16 can be coupled to one another in a variety of configurations as discussed in more detail in Warrior et al., U.S. Pat. No. 5,333,114.

In the embodiment shown in FIG. 1, the magnitude of current flowing through loop 12 represents a control output u(t) which controls flow into tank 14 by controlling the position of valve 16. Transmitter 12 preferably includes its own control function which is capable of taking over the operation of loop 20 from master controller 10 and sinking a variable amount of current to adjust control output u(t). The position of valve 18 controls the flow out of tank 14. Valve 18 is adjusted by a valve control signal o(t) which is provided by a transmitter 26 over a two-wire process control loop 28 which can be coupled to loop 20 in parallel (as shown in phantom) with loop 20 in a cascade fashion. The parallel configuration is referred to as a multidrop configuration. The valve control signal o(t) can also be provided by a separate loop which is coupled to transmitter 12 or master controller 10.

4

A sensor 24 is coupled to tank 14 for measuring a level y(t) of fluid in the tank. The rate-of-change in level dy(t)/dt is a function of the positions of valves 16 and 18. Control output u(t) has a "direct action" on the process variable y(t) since an increase in u(t) causes an increase in y(t). The signal o(t) has a "reverse action" on the process variable y(t) since an increase in o(t) causes a decrease in y(t). Sensor 24 can include any suitable sensor, such as an absolute or differential pressure sensor, an ultrasonic sensor or a microwave sensor. Other types of sensors capable of generating a signal representative of the level of fluid in tank 14 can also be used. The level control system shown in FIG. 1 is one example of a non-self-regulating process. The present invention can also be used with self-regulating processes and with other non-self-regulating processes.

FIG. 2 is a block diagram of transmitter 12 according to a first preferred embodiment of the present invention. Transmitter 12 is a "smart" transmitter in that it has computing capability, such as that performed by a microprocessor. Transmitter 12 includes a rugged, explosion proof housing 34 for mounting in the field, input terminal 36, output terminal 38, input-output circuit 40, demodulator 42, digital-to-analog (D/A) converter 44, modulator 46, microprocessor 48, analog-to-digital (A/D) converter 50, process variable sensor 52, clock circuit 54 and memory 56. Clock circuit 54 is connected to microprocessor 48 to sequence the operation of the microprocessor.

Input terminal 36 is coupled to master controller 10 (shown in FIG. 1) while output terminal 38 is coupled to valve 16 (also shown in FIG. 1). Input-output circuit 40 is coupled between input terminal 36 and output terminal 38. Circuit 40 includes input filter circuit 70, voltage regulator 72, current sink 74 and current sink 76 which are connected in series with one another in loop 20. Input-output circuit 40 receives process signals from loop 20 at input terminal 36 and supplies control output signals u(t) at output terminal 38 as a function of the process signals. Voltage regulator 72 within input-output circuit 40 receives power from loop 20 and provides a regulated voltage for powering all the various elements of transmitter 12.

The process signals used in generating control output u(t) comprise setpoints representative of a desired process state, process variables produced by the process, commands and whole or partial instruction sets for operating microprocessor 48, coefficients of terms for controlling microprocessor 48 and status requests from master controller 10. Input filter circuit 70 receives the process signals and directs the signals to demodulator 42. Demodulator 42 demodulates modulated process signals from the current loop and provides corresponding digital information to microprocessor 48. The information can be stored in memory 56 if desired.

Microprocessor 48 also receives process signals from process variable sensor 52. Sensor 52 measures a process variable y(t), such as a level as shown in FIG. 1, and provides the measurement to A/D converter 50 which digitizes the measurement for microprocessor 48. The process variable measurements can then be stored in memory 56 for analysis or transmitted back to master controller 10 over loop 20. Microprocessor 48 transmits digital information to master controller 10 through modulator 46 and current sink 76, which modulate the information onto loop 20. In an alternative embodiment, sensor 52 and A/D converter 50 are located external to transmitter 12. In this embodiment, the process variable measured by sensor 52 is communicated to microprocessor 48 over loop 20 along with other process variables from different sensors.

Current sink 74 adjusts control output u(t) by adjusting the level of current flowing through loop 20. Microprocessor 48 operates current sink 74 through D/A converter 44 based on a control algorithm or software routine stored in memory 56 and as a function of the measured process variable y(t), stored control parameters and instructions received from master controller 10. For example, master controller 10 may provide a set point $Y_{SET}$ or other command to microprocessor 48 which instructs the microprocessor to adjust control output u(t) such that the process variable y(t) approaches the set point $Y_{SET}$.

According to the present invention, memory 56 also includes an auto-tuning algorithm or software routine which tunes the control parameters used by the control algorithm to match the process being controlled. The auto-tuning algorithm causes microprocessor 48 to adjust control output u(t) over time and observe a response in the process variable y(t). From this response, microprocessor 48 can estimate model parameters for the process and use the model parameters to calculate the desired control parameters.

The communication methods and transmitter connections discussed with reference to FIG. 2 are provided as examples only. Other configurations can also be used, such as those described in U.S. Pat. No. 5,333,114.

AUTO-TUNING

FIG. 3 is an illustration of the auto-tuning and control functions performed by microprocessor 48 according to one embodiment of the present invention. Control system 100 includes summing junction 102, PID controller 104, tuning circuit 106, switching junction 108 and process 110. For a "direct action" control output, a process variable setpoint $Y_{SET}$ is provided to a positive input of summing junction 102 and the measured process variable y(t) is provided to a negative input of summing junction 102. For a "reverse action" control output (not shown), $Y_{SET}$ is provided to a negative input of summing junction 102 and y(t) is provided to a positive input of summing junction 102. The output of summing junction 102 generates an error signal e(t) which represents the difference between the setpoint $Y_{SET}$ and the measured process variable y(t). Error signal e(t) is provided to PID controller 104. PID controller 104 includes a proportional gain block 112, an integrating block 114 and a derivative block 116. In an alternative embodiment (not shown), the measured process variable y(t) is provided directly to derivative block 116, as opposed to through summing junction 102. The outputs of blocks 112, 114 and 116 are provided to positive inputs of summing junction 118. During closed loop control, the output of summing junction 118 provides the control output u(t) to control process 110. The basic function of PID controller 104 is defined by Equation 1:

$$u(t) = K_P e(t) + \frac{K_P}{T_I} \int e(t)dt + K_P T_d \frac{de(t)}{dt} \quad \text{Eq. 1}$$

where $K_P$, $T_I$ and $T_D$ are tuned control parameters that determine the performance of PID controller 104. The control parameters are tuned, or modified according to the present invention to match the characteristics of process 110 at a commissioning stage or at any point during control of the process.

Tuning circuit 106 includes tuning control circuit 122, excitation circuit 124, process model estimation circuit 126 and control parameter rule circuit 128. Tuning control circuit 122 is coupled to excitation circuit 124, process model estimation circuit 126 and control parameter rule circuit 128 to control the overall function of tuning circuit 106. Excitation circuit 124 provides an open loop excitation signal, which varies over time, to process 110 through switching junction 108. The excitation signal is used as the control output signal during an open loop auto-tuning stage. Switching junction 108 can be an actual switch or can be a transfer of control from one algorithm or software routine to the next. Model estimation circuit 126 then observes the response in the measured process variable y(t) and generates a model of process 110, as is described in greater detail below. This model is provided to control parameter rule circuit 128 for tuning the control parameters for PID controller 104 based on a selected set of tuning rules. The process model and tuned control parameters are then stored in memory 56 (FIG. 2) and can be provided to master controller 10 over process control loop 36 to optimize the supervisory or cascade control of the process. The process model can be provided to other cascade connected devices for use in additional tuning procedures.

Tuning circuit 106 further includes a trigger circuit 134, a tuning alert circuit 136 and a real time clock 138 which are coupled to, or could be incorporated in, tuning control circuit 122. Trigger circuit 134 triggers tuning control circuit 122 to perform the auto-tuning function of the present invention based on trigger signals supplied by trigger input 140, tuning alert circuit 136 or real time clock circuit 138. Trigger input 140 is supplied by microprocessor 48 (FIG. 2) in response to commands provided by master controller 10 over process control loop 36. The commands may be initiated on demand by the user or at the request of master controller 10. Alternatively, real time clock 138 may trigger the auto-tuning function based on a selected time period, such as every half-hour. In an alternative embodiment, real time clock 138 is incorporated in master controller 10 and supplies the trigger signal to trigger input 140 over process control loop 36.

Tuning alert circuit 136 triggers the auto-tuning function through a trigger output 142. During the closed loop control stage, tuning control circuit 122 observes e(t), u(t) and y(t) and passively calculates new control parameters through circuits 126 and 128. Tuning alert circuit 136 compares the new calculations with the previously stored operating process control parameters. If the difference between the calculations is greater than a specified range, tuning alert circuit 136 triggers the auto-tuning function through trigger circuit 134 or notifies the user or master controller 10 through alert output 144. Tuning alert circuit 136 also passively verifies the estimated process model with the process by fitting current values of y(t) and u(t) into the model equation (discussed below) to see if the model is correct. If not, circuit 136 triggers the auto-tuning function or issues an alert on output 144. Circuit 136 also monitors e(t) and y(t) after a set point change or a major disturbance in the process and issues an alert if the desired performance (e.g. critically damped) is not present. For example, the integral of the square of the error signal e(t) or the integral of the absolute value of the error can be compared with a threshold value stored in memory 56. If the error integral exceeds the threshold, circuit 136 issues an alert. In addition, circuit 136 monitors y(t) during the tuning stage. If y(t) is not responding or responds incorrectly, circuit 136 generates a tuning failure alert on output 144. The user can take action to correct the auto-tuning function, such as by changing the selected values of $U_{MIN}$, $U_{MAX}$ or a performance factor α described below.

FIG. 4 is a diagram illustrating the waveforms of control output u(t) and process variable y(t). Once the auto-tuning stage has been initiated, tuning control circuit 122 monitors the sign of e(t) to determine whether y(t) is above or below $Y_{SET}$. If e(t) is negative, y(t) is above $Y_{SET}$. The control loop is opened at switching junction 108 and excitation circuit 124 forces u(t) to a user-selected minimum control output value $U_{MIN}$ at time $t_O$ to force y(t) toward $Y_{SET}$. Tuning control circuit 122 then monitors e(t). Once e(t) is below a selected threshold error level, excitation circuit 124 applies a user-selected maximum control output value $U_{MAX}$ to process 110, at time $t_R$, such that y(t) starts increasing. At time $t_{MAX}$, y(t) is maximally increasing. At time $t_F$, the minimum control output value $U_{MIN}$ is again applied to process 110 such that y(t) starts decreasing. At time $t_{-MAX}$, y(t) is maximally decreasing. At time $t_A$, the auto-tuning stage ends and process control system 100 becomes a closed PID control loop which adjusts u(t) to bring the process variable to the set point y(t)=$Y_{SET}$.

If the sign of e(t) were positive at time $t_O$, then the excitation waveform u(t) shown in FIG. 4 would simply be inverted. Excitation circuit 124 would apply u(t)=$U_{MAX}$ such that y(t) rises toward $Y_{SET}$, then u (t)=$U_{MIN}$ such that y(t) falls and then u (t)=$U_{MAX}$ such that y (t) rises again.

By varying the control output u(t) over time during the auto-tuning stage, tuning circuit 106 has the ability to estimate all system parameters accurately with repeatable and robust results such that PID controller 104 provides the desired performance. Tuning circuit 106 can be configured to estimate the process model parameters for non-self-regulating and self-regulating processes according to the present invention.

1. Non-Self-Regulating Processes

The level process shown in FIG. 1 is one example of a non-self-regulating process. A non-self-regulating process is a process in which the measured process variable y(t) will continue to increase or decrease as long as the control signal u(t) is not equal to a steady state value $U_{SS}$ (i.e., when the inlet and outlet flows are not equal in a level process). The level balance equation of the level process shown in FIG. 1 can be written as:

$$\frac{dy(t)}{dt} = m_1 u(t-L) - m_2 o(t) \quad \text{Eq. 2}$$

Equation 2 assumes that valves 16 and 18 are linear and neglects a head pressure effect on the valves. L is the system dead time and $m_1$ and $m_2$ are constants corresponding to the volume flow into and out of tank 14 divided by the area of tank 14.

When control output u(t) is at a steady state, $U_{SS}$, and the dead time effect disappears, $$\frac{dy(t)}{dt} = 0 = m_1 U_{ss} - m_2 o(t) \quad \text{Eq. 3}$$

When y(t) is maximally increasing (see FIG. 4), u(t) =$U_{MAX}$ and, $$R_R = \frac{dy(t)}{dt}\bigg|_{MAX} = m_1 U_{MAX} - m_2 o(t) = m_1(U_{MAX} - U_{SS}) \quad \text{Eq. 4}$$

Similarly, when y(t) is maximally decreasing (see FIG. 4), u(t)=$U_{MIN}$ and, $$R_F = \left|\frac{dy(t)}{dt}\right|_{-MAX} = -(m_1 U_{MIN} - m_2 o(t)) = m_1(U_{SS} - U_{MIN}) \quad \text{Eq. 5}$$

By dividing Equation 4 by Equation 5, the following mathematical relationship can be derived:

$$\frac{R_R}{R_F} = \frac{U_{MAX} - U_{SS}}{U_{SS} - U_{MIN}} \quad \text{Eq. 6}$$

A rising dead time $L_R$ and a falling dead time $L_F$ (see FIG. 4) of process variable y(t) can be written as:

$$L_R = t_{MAX} - t_R - \frac{y(t_{MAX}) - y_{MIN}}{R_R} \quad \text{Eqs. 7-8}$$

$$L_F = t_{-MAX} - t_F - \frac{y(t_{-MAX}) - y_{MAX}}{-R_F}$$

where $y(t_{MAX})$ is the process variable at time $t_{MAX}$ when the time derivative of y(t) reaches the maximum in the positive direction. Similarly, $y(t_{-MAX})$ is the process variable at time $t_{-MAX}$ when the time derivative of y(t) reaches the maximum in the negative direction. The term $Y_{MIN}$ is the minimum value of y(t) between times $t_R$ and $t_F$ and the term $Y_{MAX}$ is the maximum value of y(t) between times $t_F$ and time $t_A$. Through Equations 4–5 and 7–8, process model estimation circuit 126 calculates $L_R$, $L_F$, $R_R$ and $R_F$.

From Equations 4–5 and 6–8, the process model parameters $U_{EST}$ (estimated steady state $U_{SS}$), $m_1$ and L can be estimated as:

$$U_{EST} = \frac{R_R U_{MIN} + R_F U_{MAX}}{R_R + R_F} \quad \text{Eqs. 9-11}$$

$$m_1 = \frac{R_R}{U_{MAX} - U_{EST}} = \frac{R_F}{U_{EST} - U_{MIN}} = \frac{R_R + R_F}{U_{MAX} - U_{MIN}}$$

$$L = \max(L_R, L_F)$$

To allow the resulting PID function to compensate for the worst case, the overall system dead time L is estimated in Equation 11 as the maximum of $L_R$ and $L_F$. Process model estimation circuit 126 estimates the process model parameters $U_{EST}$, $m_1$ and L according to Equations 9–11. Equations 9–11 can easily be modified to estimate a process in which the system is reverse acting by exchanging $U_{MAX}$ and $U_{MIN}$. The process model parameters are provided to control parameter rule circuit 128 which tunes the control parameters $K_P$, $T_I$ and $T_D$ according to selected rules, as discussed in greater detail below.

The unfiltered process variable y(t) may be too noisy to produce repeatable tuning parameters. Although there are several suitable methods to handle a noisy process variable, the present invention preferably includes a low pass filter 130 (also referred to as a dynamic filter or a user damping filter) coupled to the output of process 110. With low pass filter 130, process model estimation circuit 126 can provide robust estimation of model parameters $U_{EST}$, $m_1$ and L by using Equations 9–11.

In an alternative embodiment, Equations 4–5 and 7–8 are replaced with the following equations to improve noise reduction and obtain even more reliable results. The rising rate of change $R_R$ in the process variable can be defined over a sampling period T as:

$$R_{R1} = m1(U_{MAX} - U_{SS}), \text{ where } R_{R1} = \frac{dy(t)}{dt} \text{ at } t = t_{MAX} \quad \text{Eq. 12}$$

$$R_{R2} = m1(U_{MAX} - U_{SS}), \text{ where } R_{R2} = \frac{dy(t)}{dt} \text{ at } t = t_{MAX} + T$$

. . .

$$R_{RN} = m1(U_{MAX} - U_{SS}), \text{ where } R_{RN} = \frac{dy(t)}{dt} \text{ at } t = t_{MAX} + (N-1)T$$

Since all the $R_R$'s in Equation 12 correspond to the same control signal $U_{MAX}$, the $R_R$'s can be averaged according to the following mathematical expression for a better approximation of $R_R$ in order to minimize a least square error in estimating the constant $m_1$:

$$R_R = \frac{\sum_{n=1}^{N} R_{Rn}}{N}$$ Eq. 13

Similarly, the following equation can be used for the falling direction:

$$R_F = \frac{\sum_{n=1}^{N} R_{Fn}}{N}$$ Eq. 14

The rising and falling dead times $L_R$ and $L_F$ are estimated according to Equations 7–8.

Control parameter rule circuit 128 tunes the control parameters for PID controller 104 according to a selected set of rules. Although any suitable set of rules can be used according to the present invention, circuit 128 preferably includes internal model-based control (IMC) tuning rules. With Equations 9–11, the process model parameters can be estimated with very low computational complexity. With IMC tuning rules, the corresponding control parameters for PID controllers can be derived from:

$$K_P = \frac{2\tau + L}{m_1(\tau + L/2)^2}$$ Eqs. 15–17

$$T_I = 2\tau + L$$

$$T_D = \frac{\tau L + L^2/4}{2\tau + L}$$

where $K_P$, $T_I$ and $T_D$ are the proportional gain, integral time and derivative time, respectively, of PID controller 104, and $\tau$ is a desired closed loop response time constant. The control parameters for P, PI and PD controllers are slightly different from those in Equations 15 and 16 and can be found in *Internal Model Control, PID Controller Design*, 25 Ind. Eng. Chem. Process Des. Der. 252–65 (1986). According to the present invention, the time constant $\tau$ is defined as a function of a performance factor $\alpha$, where $$\tau = \alpha L$$ Eq. 18

The performance factor $\alpha$ preferably ranges between ½ and 3 to cover the degrees of desired performance. For example, $\alpha=1$ generates a critical damped closed loop response. A smaller $\alpha$ generates a more aggressive, faster response and a larger $\alpha$ generates a more conservative, slower response. Inserting Equation 21 into Equations 18–20, the corresponding PID tuned control parameters become:

$$K_P = \frac{4}{m_1 T_I}$$ Eqs. 19–21

$$T_I = (2\alpha + 1) L$$

$$T_D = \frac{\alpha + 1/4}{2\alpha + 1} L$$

The PID tuned control parameters $K_P$, $T_I$ and $T_D$ can therefore be calculated by control parameter rule circuit 128 with low computational complexity. The performance factor $\alpha$ is provided to circuit 128 through an input 132 and control circuit 122. In the embodiment shown in FIG. 2, the performance factor $\alpha$ is provided to microprocessor 48 by master controller 10 as a digital value modulated on loop 20.

In an alternative embodiment, process model estimation circuit 126 and control parameter rule circuit 128 are combined and the control parameters are calculated directly as a function of $L_R$, $L_F$, $R_R$, and $R_F$. The process model parameter equations are folded into the control parameter equations such that separate calculations of the process model parameters are unnecessary.

In the previous discussion, it has been assumed that the process is linear. For a non-linear process, such as a process with non-linear valve characteristics and head pressure effects on the valve, the actual stable state valve position during normal closed loop control at the end of time sequence $t_A$ can be used to replace the estimated value $U_{EST}$ in Equations 10 and 15 for a more reliable performance.

2. Self-Regulating Processes

Process model estimation circuit 126 (shown in FIG. 3) can also be configured for estimating the process model parameters for a self-regulating process such as heat exchanger temperature, flow and pressure control processes. Most self-regulated processes can be modeled by the following first order plus dead time equation:

$$T_C \frac{dy(t)}{dt} + y(t) = K_S u(t - L)$$ Eq. 22 where process model parameters L, $T_C$ and $K_S$ represent the dead time, time constant and static gain of the process, respectively.

The process model parameters are estimated by applying the open loop control pattern u(t) that is shown in FIG. 5. As in the non-self-regulating process, the auto-tuning circuit of the present invention separates the process model parameters in the rising and falling directions to model the worst case performance. Considering the rising direction when u(t) $=U_{MAX}$ and y(t) is increasing (dy(t)/dt>0) and assuming the dead time L has passed, the following equations can be written from time $t_{MAX}$ to time $t_F$:

$$T_R R_{R1} + y_1 = K_R U_{MAX}$$ Eq. 23

$$T_R R_{R2} + y_2 = K_R U_{MAX}$$

$$\ldots$$

$$T_R R_{RN} + y_N = K_R U_{MAX}$$

where $T_R$ and $K_R$ are the time constant and static process gain in the rising direction and N is the number of samples of y(t) in the rising direction. $R_{Rn}$ is the rate of change of y(t) at an nth sample after $t_{MAX}$, which is defined as:

$$R_{Rn} = \frac{dy(t)}{dt} \text{ at } t = t_{MAX} + (n-1)T$$ Eq. 24 where T is the sample period. The matrix form of the above equation can be written as:

$$\begin{bmatrix} R_{R1} & -U_{MAX} \\ \ldots & \ldots \\ R_{RN} & -U_{MAX} \end{bmatrix} \begin{bmatrix} T_R \\ K_R \end{bmatrix} = \begin{bmatrix} -y_1 \\ \ldots \\ -y_N \end{bmatrix}$$ Eq. 25

This equation can be solved to estimate $T_R$ and $K_R$ while minimizing the least square error by using the pseudo inverse of the matrix on the left-hand side of Equation 25. This can be done by modifying the above equation by Equation 26:

$$\begin{bmatrix} R_{R1} & \ldots & R_{RN} \\ -U_{MAX} & \ldots & -U_{MAX} \end{bmatrix}$$ Eq. 26 which results in:

$$\begin{bmatrix} \sum_{n=1}^{N} R_{Rn}^2 - U_{MAX} \sum_{n=1}^{N} R_{Rn} \\ -U_{MAX} \sum_{n=1}^{N} R_{Rn} \ NU_{MAX}^2 \end{bmatrix} \begin{bmatrix} T_R \\ K_R \end{bmatrix} = \begin{bmatrix} -\sum_{n=1}^{N} R_{Rn} \\ U_{MAX} \sum_{n=1}^{N} y_n \end{bmatrix} \quad \text{Eq. 27}$$

From Equation 27, the following estimations can be derived:

$$\begin{bmatrix} T_R \\ K_R \end{bmatrix} = \quad \text{Eq. 28}$$

$$\frac{1}{U_{MAX}(N\Sigma R_{Rn}^2 - (\Sigma R_{Rn})^2)} \begin{bmatrix} -NU_{MAX}\Sigma y_n R_{Rn} + U_{MAX}(\Sigma R_{Rn})(\Sigma y_n) \\ (-\Sigma R_{Rn})(\Sigma R_{Rn} y_n) + (\Sigma R_{Rn}^2)(\Sigma y_n) \end{bmatrix}$$

The same method can be used to derive the rising system dead time $L_R$ as was used for the non-self-regulating process:

$$L_R = t_{MAX} - t_R - \frac{y(t_{MAX}) - y_{MIN}}{R_{R1}} \quad \text{Eq. 29}$$

where $R_{R1}$ is the rising rate-of-change of y(t) at sample n=1.

In the falling direction, u(t)=$U_{MIN}$ and y(t) is decreasing (dy(t)<0). Similar equations can be used to estimate time constant $T_F$, static gain $K_F$ and dead time $L_F$ for the falling direction, as shown below:

$$\begin{bmatrix} T_F \\ K_F \end{bmatrix} = \quad \text{Eqs. 30-31}$$

$$\frac{1}{U_{MIN}(N\Sigma R_{Fn}^2 - (\Sigma R_{Fn})^2)} \begin{bmatrix} -NU_{MIN}\Sigma y_n R_{Fn} + U_{MIN}(\Sigma R_{Fn})(\Sigma y_n) \\ (-\Sigma R_{Fn})(\Sigma R_{Fn} y_n) + (\Sigma R_{Fn}^2)(\Sigma y_n) \end{bmatrix}$$

$$L_F = t_{MAX} - t_F - \frac{y(t_{MAX}) - y_{MAX}}{R_{F1}}$$

where $R_{F1}$ is the falling rate-of-change of y(t) at sample n=1.

During operation, from time $t_R$ to time $t_F$, process model estimation circuit 126 (FIG. 3) estimates $L_R$ according to Equation 32 and counts the variables $\Sigma R_{Rn}$, $\Sigma R_{Rn}^2$, $\Sigma Y_n$ and $\Sigma Y_n R_{Rn}$ in Equation 28. From time $t_F$ to time $t_A$, circuit 126 estimates $L_F$ according to Equation 34 and counts the variables $\Sigma R_{Fn}$, $\Sigma R_{Fn}^2$, $\Sigma Y_n$ and $\Sigma Y_n R_{Fn}$ in Equation 33.

A typical process behaves differently in the rising and falling directions. For example, in temperature control applications, the process may exhibit this behavior because of endothermic and exothermic reactions in the process. Arbitrarily choosing the process model parameters in either the rising or falling direction can sometimes lead to an undesirable closed loop control performance. The process model estimation circuit of the present invention obtains a more robust PID control performance. First, a strong low-pass filter (filter 130) is used to prevent noise from corrupting the derivative signal dy(t)/dt. Second, the process model parameters are estimated by circuit 126 according to the following equations:

$$K_S = \max(K_R, K_F) \quad \text{Eqs. 32-34}$$

$$T_C = \min(T_R, T_F)$$

$$L = \max(L_R, L_F)$$

Once the process model parameters have been estimated for the first order plus dead time process equation, the P, T and D control parameters can be tuned as a function of several existing tuning rules. For example, the following Internal Model Control (IMC) tuning rules have been found to give preferred PID control performance:

$$K_P = \frac{2T_C + L}{K_S(2\tau + L)} \quad \text{Eqs. 35-37}$$

$$T_I = T_C + \frac{L}{2}$$

$$T_D = \frac{T_C L}{2T_C + L}$$

where $K_P$, $T_I$ and $T_D$ are the proportional gain, integral time and derivative time, respectively. As with the non-self-regulating process, the closed loop time constant $\tau$ is defined as a function of the performance factor $\alpha$, where $$\tau = \alpha L \quad \text{Eq. 38}$$

As discussed above, the performance factor $\alpha$ preferably ranges between ½ and 3. Equation 34 ensures a maximum closed loop time constant $\tau$. Equations 32 and 33 ensure the smallest possible proportional gain $K_P$ for a given performance factor $\alpha$.

The auto-tuning circuit of the present invention can also be implemented in a valve control unit, for example. FIG. 6 is similar to FIG. 2 and is a block diagram of a valve control unit 160 which includes input filter circuit 162, voltage regulator 164, adjustable current sink 166, current transducer 168, demodulator 170, A/D converter 172, modulator 174, microprocessor 176, memory 178, clock circuit 180, D/A converter 182 and actuator 184. Circuit 162, regulator 164, and current transducer 168 are connected in series with process control loop 186 for receiving the measured process variable y(t) and modulated digital data, such as a set point $Y_{SET}$, from the loop.

Demodulator 170 demodulates the data and provides the data to microprocessor 176 for analysis. Regulator 164 receives power from loop 186 and provides a regulated voltage for powering the elements of valve control unit 160. Current transducer 168 measures the analog current level y(t) in loop 186, which is converted by A/D converter 172 into digital data for microprocessor 176. Microprocessor 176 transmits data over loop 186 by modulating the current through sink 166 with modulator 174, such as by the HART® protocol. The auto-tuning algorithm, control algorithm, process model and tuning parameters are stored in memory 178 for configuring microprocessor 176 to control actuator 184 through D/A converter 182 as a function of the measured process variable y(t) and the set point $Y_{SET}$.

The auto-tuning circuit of the present invention has several advantages that are not present in existing tuning techniques. The auto-tuning circuit generates accurate model parameters with only simple calculations. The simple calculations allow the auto-tuning circuit to be implemented in low-power and low-memory applications, such as in field-mounted control units. A 4-20 mA current loop provides only a few milli-Amps after the signal range is subtracted to power all of the electronic components in the unit. This limits the complexity of the components and the memory space. A typical memory in a transmitter may be limited to 8K to 64K bytes, for example.

The auto-tuning circuit of the present invention does not require much user interaction. Unlike the Ziegler-Nichols' open loop test, the auto-tuning circuit of the present invention does not require users to establish a stable state before the open loop test is run and instead has an ability to assess the stable state conditions. The user sets up the tuning procedure by providing initial variables such as desired $U_{MAX}$ and $U_{MIN}$ levels, selects a desired performance factor $\alpha$ and then initiates the auto-tuning procedure.

The auto-tuning circuit of the present invention can be implemented as a manual operation or an automatic operation, and it carl be operated in the loop commissioning stage at system initialization, or at any other time the user wishes to tune the loop. For automatic operation, the auto-tuning circuit is capable of bringing the process variable close to the set point and starting the tuning exercise automatically without the user's involvement. With manual operation, the user brings the process variable close to the set point and then initiates tuning through master controller 10.

The auto-tuning circuit of the present invention generates a guided disturbance of the process. Unlike closed loop relay control based tuning or other frequency domain techniques, the present invention can be restricted to operate within a defined zone. For example, some users may prefer a u(t) disturbance of only 10% and 75% of the full scale. The auto-tuning circuit is simple, user friendly, repeatable and robust. It can be used to tune control parameters for P, PI, PD, PID and other types of controllers such as fuzzy logic controllers. Suitable fuzzy logic controllers are described in the article "Auto-Tuned Fuzzy Logic Control," by J. Quin, *ACC Conference* 1994, Baltimore Md., which is hereby incorporated by reference.

Although the present invention has been described with reference to preferred embodiments, workers skilled in the art will recognize that changes may be made in form and detail without departing from the spirit and scope of the invention. The tuning circuit can be implemented as a software routine or algorithm stored in memory for execution by a programmed computer, such as a microprocessor. In alternative embodiments, the circuit is implemented in digital or analog hardware. The tuning circuit can be located in the transmitter, in the valve or in master controller 10. Master controller 10 can be located in a central control room, at a remote location near the transmitter or valve or in a hand-held configurator which is used to configure the transmitter during the commissioning stage. The tuning circuit can estimate the process model parameters and tune the control parameters in different calculation stages or can fold the process model parameter equations into the control parameter equations such that there is only one calculation stage. Other configurations can also be used according to the present invention.

What is claimed is:

1. A process control apparatus for controlling a process through a control output signal as a function of a measured process variable, comprising:

control means having a process variable input and a control output, wherein the control means generates the control output signal on the control output in response to the measured process variable received on the process variable input and based on control function parameters; and tuning means comprising:

excitation means having an excitation output coupled to the control output for generating an excitation signal which rises and falls over time;

estimating means for calculating a rise dead time $L_R$, a fall dead time $L_F$, a rising rate-of-change $R_R$ and a falling rate-of-change $R_F$ in the measured process variable in response to the excitation signal and for estimating a process model based on $L_R$, $L_F$, $R_R$ and $R_F$; and parameter calculating means coupled to the estimating means for calculating the control function parameters based on the process model.

2. The process control apparatus of claim 1 wherein the estimating means comprises means for calculating $R_R$ and $R_F$ as a maximum rising and falling rate-of-change of the measured process variable, respectively.

3. The process control apparatus of claim 1 wherein the estimating means comprises means for calculating $R_R$ and $R_F$ according to the mathematical expressions:

$$R_R = \frac{\sum_{n=1}^{N} R_{Rn}}{N}$$

$$R_F = \frac{\sum_{n=1}^{N} R_{Fn}}{N}$$

where N is a selected number of samples of the measured process variable in the rising and falling directions and $R_{Rn}$ and $R_{Fn}$ are the rising and falling rates-of-change of the measured process variable at the nth sample.

4. The process control apparatus of claim 1 wherein the estimating means comprises:

means for incrementing the excitation output signal from a selected minimum value $U_{MIN}$ to a selected maximum value $U_{MAX}$ and for decrementing the excitation signal from $U_{MAX}$ to $U_{MIN}$; and means for calculating $L_R$ and $L_F$ according to the mathematical expressions:

$$L_R = t_{MAX} - t_R - \frac{y(t_{MAX}) - y_{MIN}}{R_R}$$

$$L_F = t_{-MAX} - t_F - \frac{y(t_{-MAX}) - y_{MAX}}{-R_F}$$

where $t_{MAX}$ and $t_{-MAX}$ are times at which the measured process variable is maximally increasing and decreasing, respectively, $t_R$ and $t_F$ are times at which $U_{MAX}$ and $U_{MIN}$ are applied to the excitation output, respectively, $Y(t_{MAX})$ and $Y(t_{-MAX})$ are values of the measured process variable at times $t_{MAX}$ and $t_{-MAX}$, respectively, $Y_{MIN}$ is the minimum measured process variable between times $t_R$ and $t_F$, and $Y_{MAX}$ is the maximum measured process variable between times $t_F$ and $t_A$, where $t_A$ is a time at which $U_{MIN}$ is removed.

5. The process control apparatus of claim 1 wherein the process model includes a process dead time value L and the estimating means estimates L as the maximum of $L_R$ and $L_F$.

6. The process control apparatus of claim 1 wherein the excitation means comprises:

means for incrementing the excitation signal from a selected minimum value $U_{MIN}$ to a selected maximum value $U_{MAX}$ and for decrementing the excitation signal from $U_{MAX}$ to $U_{MIN}$.

7. The process control apparatus of claim 6 wherein the apparatus is configured for controlling a non-self-regulated process in which the process model parameters include a constant $m_1$ and the estimating means comprises means for estimating $m_1$ according to the mathematical expression:

$$m_1 = \frac{R_R + R_F}{U_{MAX} - U_{MIN}}$$

8. The process control apparatus of claim 6 wherein the apparatus is configured for controlling a non-self-regulated process in which the process model parameters include an estimated steady state value $U_{EST}$ of the control output signal and the estimating means comprises means for estimating $U_{EST}$ according to the mathematical expression:

$$U_{EST} = \frac{R_R U_{MIN} + R_F U_{MAX}}{R_R + R_F}$$

9. The process control apparatus of claim 6 wherein the apparatus is configured for controlling a self-regulated process in which the process model parameters include a time constant $T_C$, a static process gain $K_S$, and a process dead time L and wherein the estimating means comprises:

means for calculating a rising time constant $T_R$, a rising static process gain $K_R$, a falling time constant $T_F$ and a falling static gain $K_F$ according to the mathematical expressions:

$$\begin{bmatrix} T_R \\ K_R \end{bmatrix} =$$

$$\frac{1}{U_{MAX}(N\Sigma R_{Rn}^2 - (\Sigma R_{Rn})^2)} \begin{bmatrix} -NU_{MAX}\Sigma y_n R_{Rn} + U_{MAX}(\Sigma R_{Rn})(\Sigma y_n) \\ (-\Sigma R_{Rn})(\Sigma R_{Rn} y_n) + (\Sigma R_{Rn}^2)(\Sigma y_n) \end{bmatrix}$$

$$\begin{bmatrix} T_F \\ K_F \end{bmatrix} =$$

$$\frac{1}{U_{MIN}(N\Sigma R_{Fn}^2 - (\Sigma R_{Fn})^2)} \begin{bmatrix} -NU_{MIN}\Sigma y_n R_{Fn} + U_{MIN}(\Sigma R_{Fn})(\Sigma y_n) \\ (-\Sigma R_{Fn})(\Sigma R_{Fn} y_n) + (\Sigma R_{Fn}^2)(\Sigma y_n) \end{bmatrix}$$

where N is a number of samples of the measured process variable in the rising and falling directions, n ranges from 1 to N, $R_{Rn}$ is the rising rate-of-change of the measured process variable at the nth sample, $Y_n$ is the measured process variable at the nth sample and $R_{Fn}$ is the falling rate-of-change of the measured process variable at the nth sample; and means for estimating $T_C$ as a minimum of $T_R$ and $T_F$ and estimating $K_S$ as a maximum of $K_R$ and $K_F$.

10. The process control apparatus of claim 9 wherein the estimating means further comprises:

means for calculating a rising process dead time $L_R$ and a falling process dead time $L_F$ according to the mathematical expressions:

$$L_R = t_{MAX} - t_R - \frac{y(t_{MAX}) - y_{MIN}}{R_{R1}}$$

$$L_F = t_{-MAX} - t_F - \frac{y(t_{-MAX}) - y_{MAX}}{R_{F1}}$$

where $t_{MAX}$ and $t_{-MAX}$ are times at which the measured process variable is maximally increasing and decreasing, respectively, $t_R$ and $t_F$ are times at which $U_{MAX}$ and $U_{MIN}$ are applied to the excitation output, respectively, $y(t_{MAX})$ and $Y(t_{-MAX})$ are the measured process variable at times $t_{MAX}$ and $t_{-MAX}$, respectively, $Y_{MIN}$ is the minimum measured process variable between times $t_R$ and $t_F$, $Y_{MAX}$ is the maximum measured process variable between times $t_F$ and $t_A$, where $t_A$ is a time at which $U_{MIN}$ is removed, and $R_{R1}$ and $R_{F1}$ are the rising and falling rates-of-change of the measured process variable at sample n=1, respectively; and means for estimating L as a maximum of $L_R$ and $L_F$.

11. The process control apparatus of claim 1 wherein the parameter calculating means comprises means for receiving a selected closed loop response performance factor and calculates the control function parameters based on the selected performance factor.

12. The process control apparatus of claim 1 and further comprising tuning initiation means coupled to the tuning means for initiating the excitation means, estimating means and parameter calculating means.

13. The process control apparatus of claim 12 wherein the tuning initiation means comprises a trigger input for receiving a trigger command signal.

14. The process control apparatus of claim 12 wherein the tuning initiation means comprises a real time clock which triggers initiation of the excitation means, estimating means and parameter calculating means based on a selected time period.

15. The process control apparatus of claim 12 wherein the tuning initiation means is coupled to the process and comprises means for comparing the process model and the control function parameters with a present operation of the process and for initiating the tuning means as a function of the comparison.

16. The process control apparatus of claim 15 and further comprising means for generating an alert signal as a function of the comparison.

17. The process control apparatus of claim 12 wherein the control means comprises means for generating an error signal as a function of the measured process variable and wherein the tuning initiation means is coupled to the control means and comprises means for measuring performance of the control means as a function of the error signal.

18. The process control apparatus of claim 1 wherein the control means is selected from the group consisting of P, PI, PD, PID and fuzzy logic controllers.

19. A smart field-mounted control unit powered over a process control loop and for controlling a process through a control output signal based on a measured process variable, comprising:

input-output means adapted to be coupled to the process control loop and for receiving power from the process control loop;

microprocessor means coupled to the input-output means and comprising:

control means having a process variable input and a control output, wherein the control means generates the control output signal on the control output in response to the measured process variable received on the process variable input and based on control function parameters; and tuning means coupled to the control means for tuning the control function parameters to the process based on the measured process variable; and a memory coupled to the microprocessor means for storing the control function parameters.

20. The smart field-mounted control unit of claim 19 wherein the input-output circuit is configured to be coupled to the process control loop, which is selected from the group consisting of two-wire, three-wire and four-wire process control loops.

21. The smart field-mounted control unit of claim 19 wherein the process control loop is a two-wire process control loop and the input-output circuit is configured to be coupled to and receive power from the two-wire process control loop.

22. A smart field-mounted control unit which is powered by a process control loop and controls a process through a control output signal as a function of a measured process variable, comprising:

an input-output circuit configured to be coupled to the process control loop and for receiving power from the process control loop;

a controller having a process variable input and a control output, wherein the controller generates the control output signal on the control output in response to the measured process variable received on the process variable input and based on control function parameters;

a tuning circuit comprising:

an excitation circuit having an excitation output coupled to the control output, which generates an excitation signal that rises and falls;

an estimating circuit coupled to the process variable input, which estimates a model of the process based on a rising dead time $L_R$, a falling dead time $L_F$, a rising rate-of-change $R_R$ and a falling rate-of-change $R_F$ in the measured process variable in response to the excitation signal; and a parameter calculating circuit coupled to the estimating circuit and the control circuit, which calculates the control function parameters based on the process model and control function rules; and a memory coupled to the control and tuning circuits for storing the control function parameters and the control function rules.

23. The smart field-mounted control unit of claim 22 wherein the input-output circuit is configured to be coupled to the process control loop, which is selected from the group consisting of two-wire, three-wire and four-wire process control loops.

24. The smart field-mounted control unit of claim 22 wherein the process control loop is a two-wire process control loop and the input-output circuit is configured to be coupled to and receive power from the two-wire process control loop.

25. In a process control apparatus having a controller with a process variable input and a control output, wherein the controller controls a process through a control output signal generated on the control output as a function of a measured process variable received on the process variable input, the improvement comprising:

a tuning circuit comprising:

excitation means having an excitation output coupled to the control output for generating an excitation signal which rises and falls over time;

estimating means for estimating a process model based on a rising dead time $L_R$, a falling dead time $L_F$, a rising rate-of-change $R_R$ and a falling rate-of-change $R_F$ in the measured process variable in response to the excitation signal; and parameter calculating means coupled to the estimating means for determining the function of the controller based on the process model.

26. A method of determining tuning parameters for a process control system which controls a process through a control output signal as a function of a measured process variable and a set point, the method comprising:

varying the control output signal over time such that the measured process variable rises and falls;

determining a rising dead time $L_R$ in the measured process variable;

determining a rising rate-of-change $R_R$ in the measured process variable;

determining a falling dead time $L_F$ in the measured process variable;

determining a falling rate-of-change $R_F$ in the measured process variable; and tuning the function of the process control system based on $L_R$, $L_F$, $R_R$ and $R_F$.

27. The method of claim 26 wherein tuning the function of the process control system comprises:

defining a process model with process model parameters;

estimating the process model parameters as a function of $L_R$, $L_F$, $R_R$ and $R_F$;

defining the function of the process control system with a control equation which comprises control parameters; and tuning the control parameters as a function of the process model parameters.

28. The method of claim 26 wherein tuning the function of the process control system comprises:

defining the function of the process control system with a control equation which comprises control parameters; and tuning the control parameters directly as a function of $L_R$, $L_F$, $R_R$ and $R_F$.

29. The method of claim 27 and further comprising:

coupling first and second smart field-mounted control units to one another over a process control loop, wherein the steps of claim 27 are performed by the first smart field-mounted control unit; and passing the process model from the first smart field-mounted control unit to the second smart field-mounted control unit.

* * * * *